United States Patent
Shiozaki

(10) Patent No.: US 8,937,674 B2
(45) Date of Patent: Jan. 20, 2015

(54) ELECTRONIC APPARATUS EQUIPPED WITH FUNCTION FOR NOTIFYING ACCEPTANCE OF OPERATION, METHOD OF CONTROLLING ELECTRONIC APPARATUS, AND STORAGE MEDIUM

(71) Applicant: Canon Kabushiki Kaisha, Tokyo (JP)

(72) Inventor: Tomoyuki Shiozaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 207 days.

(21) Appl. No.: 13/724,817

(22) Filed: Dec. 21, 2012

(65) Prior Publication Data

US 2013/0169848 A1    Jul. 4, 2013

(30) Foreign Application Priority Data

Dec. 28, 2011   (JP) .................. 2011-288268

(51) Int. Cl.
   *H04N 5/222*    (2006.01)
   *G06F 3/041*    (2006.01)
   *G06F 3/044*    (2006.01)
(52) U.S. Cl.
   CPC .............. *G06F 3/041* (2013.01); *G06F 3/0416* (2013.01); *G06F 3/044* (2013.01); *G06F 2203/04101* (2013.01)
   USPC .................. 348/333.01; 348/207.99; 345/173
(58) Field of Classification Search
   USPC .......................... 348/207.99, 333.01; 345/173
   See application file for complete search history.

(56) References Cited

U.S. PATENT DOCUMENTS

| 2006/0022958 A1* | 2/2006 | Shiga ............................ 345/173 |
| 2008/0224900 A1* | 9/2008 | Konno et al. .................... 341/33 |
| 2011/0187675 A1* | 8/2011 | Nakai et al. .................... 345/174 |
| 2012/0007828 A1* | 1/2012 | Mizuhashi et al. ........... 345/174 |
| 2013/0093721 A1* | 4/2013 | Nakamura et al. ............ 345/174 |
| 2013/0190054 A1* | 7/2013 | Kulas ............................ 455/566 |

FOREIGN PATENT DOCUMENTS

JP      2002-149312      5/2002

* cited by examiner

*Primary Examiner* — Anthony J Daniels
(74) *Attorney, Agent, or Firm* — Cowan, Liebowitz & Latman, P.C.

(57) ABSTRACT

An electronic apparatus capable of reducing a time lag between an operation on an operation section and notification of acceptance of the operation. An audio codec section and a speaker perform notification indicating reception of the operation according to the operation performed on the operation section. A PLL circuit supplies the audio codec section and the speaker with a clock signal for causing the audio codec section and the speaker to operate. A system controller detects an approach of a finger for operating the operation section, to the operation section. Further, the system controller starts the PLL circuit or increases a clock frequency supplied from the PLL circuit, when the system controller detects that the distance between the finger and the operation section has become equal to or smaller than a first distance.

13 Claims, 10 Drawing Sheets

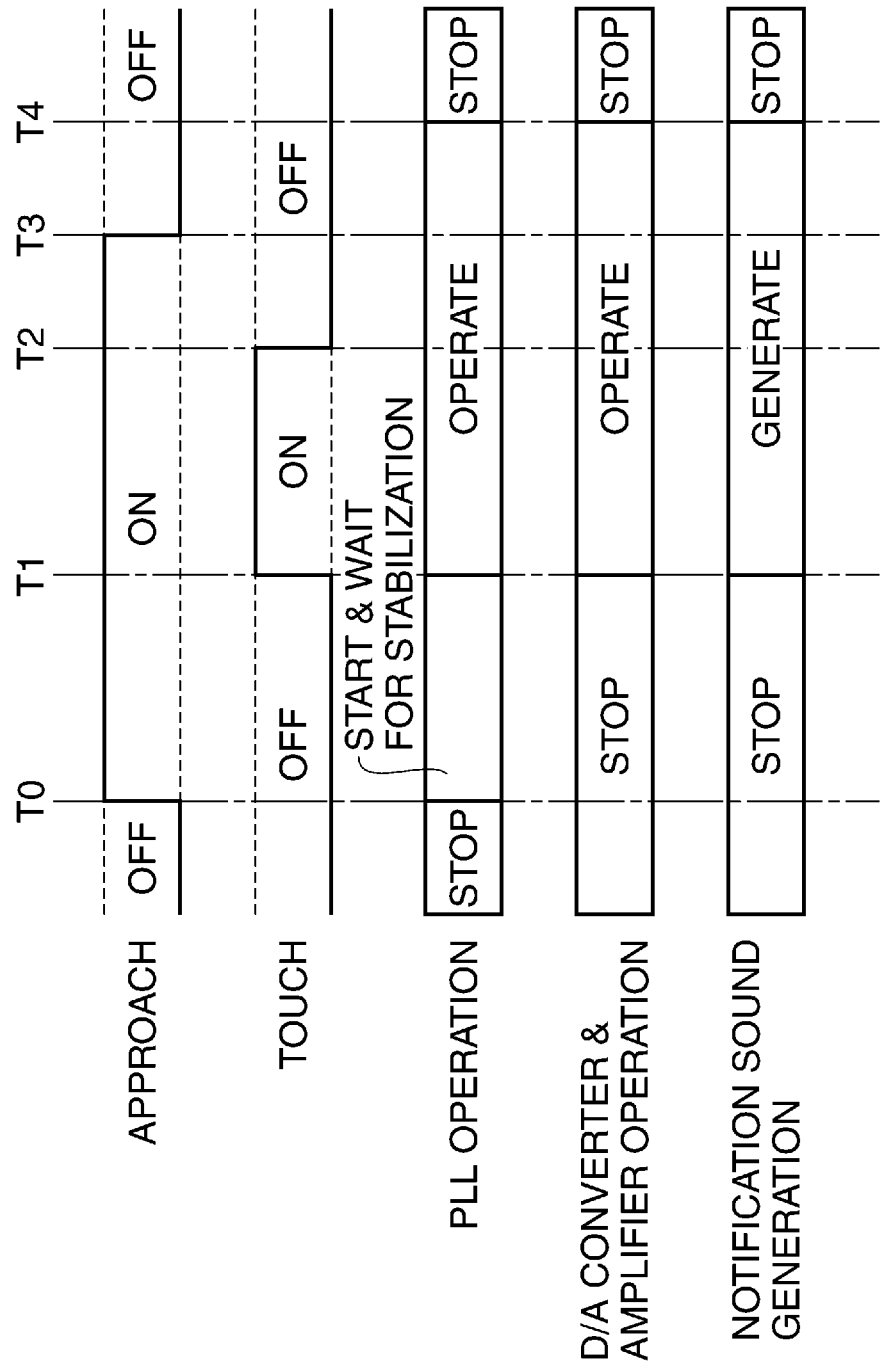

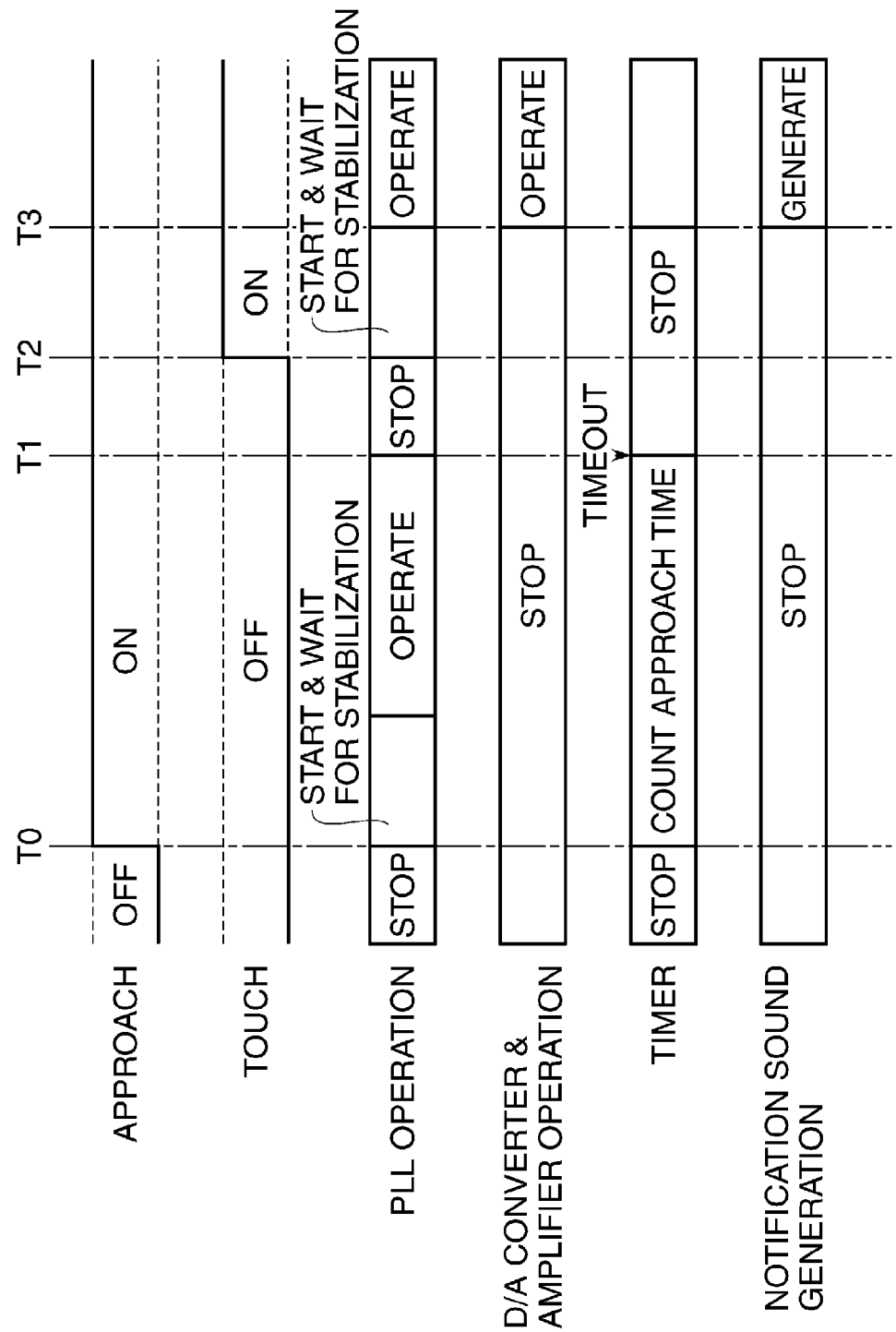

ELECTRONIC APPARATUS EQUIPPED WITH FUNCTION FOR NOTIFYING ACCEPTANCE OF OPERATION, METHOD OF CONTROLLING ELECTRONIC APPARATUS, AND STORAGE MEDIUM

BACKGROUND OF THE INVENTION

1. Field of the Invention

The present invention relates to an electronic apparatus, a method of controlling the same, and a storage medium, and more particularly to an electronic apparatus equipped with a touch panel or a touch sensor as a user interface.

2. Description of the Related Art

In general, in an electronic apparatus, such as a personal computer, a PDA (personal digital assistant), or a cellular phone, a touch panel or a touch sensor (hereinafter generically referred to as the "touch operation section") as a user interface.

Differently from a so-called mechanical button, the touch operation section suffers lack of feeling of an operation, such as a push feeling, caused by application of pushing pressure. This sometimes makes it difficult for a user to determine whether or not a touch operation by the user is accepted by the electronic apparatus. To eliminate this inconvenience, for example, there has been known a method of notifying the user of acceptance of a touch operation using sound and vibration (see Japanese Patent Laid-Open Publication No. 2002-149312).

To notify the user that a user's touch operation has been accepted by the electronic apparatus without causing an odd sensation in the user, it is desirable to generate notification sound instantly after the touch operation.

In general, however, a sound generation circuit installed on the electronic apparatus often uses a PLL (phase locked loop) circuit as a circuit for generating a sound sampling clock. Further, it is known that it takes a predetermined time period to start the PLL circuit.

The PLL circuit feedback-controls a voltage controlled oscillator such that a phase difference between a reference signal and an output from the voltage controlled oscillator (referred to as the "oscillation output") is constant. In the PLL circuit, the voltage controlled oscillator is controlled according to a voltage indicated by a difference signal representing a phase difference between the reference signal and a signal generated by dividing the oscillation output, and the oscillation output synchronous with the reference signal is output from the voltage controlled oscillator.

At this time, an AC component of the difference signal is filtered out by a filter circuit, but to sufficiently remove jitter from the difference signal (input signal), the time constant of the filter circuit is inevitably increased. This makes slow the response characteristic of the filter circuit. In other words, it takes time for the filter circuit to respond, which causes a problem of an increase in time required to obtain the oscillation output synchronous with the reference signal after input of the reference signal.

In a case where such a PLL circuit is used, a time lag is caused between a time point when a touch operation by the user is received and a time point when notification sound is generated. On the other hand, to reduce the time lag between the touch operation and generation of the notification sound, if the PLL circuit is always energized, power is always consumed.

SUMMARY OF THE INVENTION

The present invention provides an electronic apparatus which is capable of reducing a time lag between an operation on an operation section and notification of acceptance of the operation, a method of controlling the electronic apparatus, and a storage medium.

Further, the present invention provides an electronic apparatus which is capable of reducing power consumption, when an operation on a operation section, such as a touch panel, is accepted and acceptance of the operation is notified, a method of controlling the electronic apparatus, and a storage medium.

In a first aspect of the present invention, there is provided an electronic apparatus that notifies, when a predetermined operation has been performed on an operation section, that the operation has been accepted, comprising a notification unit configured to perform notification indicating reception of an operation performed on the operation section according to the operation, a clock supply unit configured to supply the notification unit with a clock signal for causing the notification unit to operate, a detection unit configured to detect an approach of an operation body for operating the operation section, to the operation section, and a control unit configured to perform control such that the clock supply unit is started or such that a clock frequency supplied from the clock supply unit is increased, when it is detected by the detection unit that a distance between the operation body and the operation section has become equal to or smaller than a first distance which is larger than a distance at which the operation unit receives an operation about which the notification unit is to perform the notification.

In a second aspect of the present invention, there is provided a method of controlling an electronic apparatus including a notification unit configured to perform notification indicating reception of an operation performed on the operation section according to the operation, and a clock supply unit configured to supply the notification unit with a clock signal for causing the notification unit to operate, comprising detecting an approach of an operation body for operating the operation section, to the operation section, and performing control such that the clock supply unit is started or such that a clock frequency supplied from the clock supply unit is increased, when it is detected by the detecting that a distance between the operation body and the operation section has become equal to or smaller than a first distance which is larger than a distance at which the operation unit receives an operation about which the notification unit is to perform the notification.

In a third aspect of the present invention, there is provided a non-transitory computer-readable storage medium storing a computer-executable program for causing a computer included in an electronic apparatus to execute a method of controlling the electronic apparatus including a notification unit configured to perform notification indicating reception of an operation performed on the operation section according to the operation, and a clock supply unit configured to supply the notification unit with a clock signal for causing the notification unit to operate, wherein the method comprises detecting an approach of an operation body for operating the operation section, to the operation section, and performing control such that the clock supply unit is started or such that a clock frequency supplied from the clock supply unit is increased, when it is detected by the detecting that a distance between the operation body and the operation section has become equal to or smaller than a first distance which is larger than a distance at which the operation unit receives an operation about which the notification unit is to perform the notification.

According to the present invention, when notifying acceptance of an operation on the operation section, it is possible to reduce a time lag between the operation and the notification, and further to reduce power consumption.

Further features of the present invention will become apparent from the following description of exemplary embodiments with reference to the attached drawings.

BRIEF DESCRIPTION OF THE DRAWINGS

FIGS. 2A and 2B are views useful in explaining a difference between a proximity of a finger to a touch panel appearing in FIG. 1 and a touch operation, in which FIG. 2A shows a state in which the finger is caused to come closer to the touch panel, and FIG. 2B shows a state in which the touch operation is performed on the touch panel.

FIGS. 6A to 6D are views useful in explaining the operation timing of the audio codec section during the touch operation-accepting process described with reference to FIGS. 5A and 5B, in which FIG. 6A shows operation timing in a case where a touch operation is performed, FIG. 6B shows operation timing in a case where a time period over which touch notification sound is generated is longer than in the FIG. 6A case, FIG. 6C shows operation timing in a case where after detecting a proximity of the finger to the panel, a state in which a touch of the finger on the touch panel is not detected continues for a long time, and FIG. 6D shows operation timing in a case where a state in which the finger is touching the touch panel continues for a long time.

DESCRIPTION OF THE EMBODIMENTS

The present invention will now be described in detail below with reference to the accompanying drawings showing embodiments thereof. The following description will be given of an image pickup apparatus as one of electronic apparatuses, by way of example.

Figure 1:
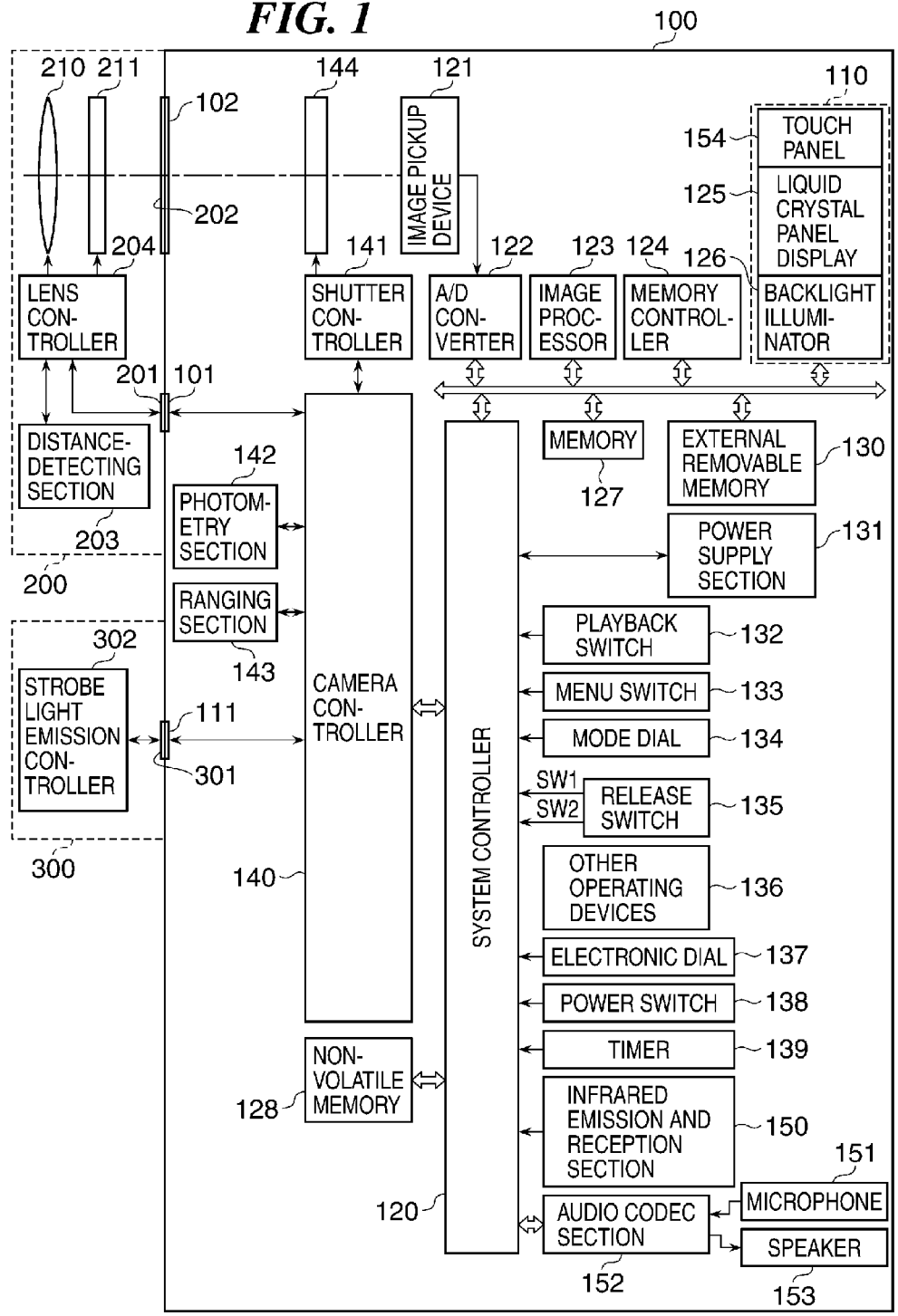
FIG. 1 is a block diagram of an image pickup device according to an embodiment of the present invention.

FIG. 1 is a block diagram of the image pickup apparatus according to an embodiment of the present invention.

Referring to FIG. 1, the illustrated image pickup apparatus includes a display device equipped with a touch panel function, and a lens unit-replaceable apparatus capable of replacing a lens unit by another.

The image pickup apparatus 100 includes an image pickup device (e.g. a CCD (charged coupled device) sensor or a CMOS (complementary metal oxide semiconductor) sensor) 121 on which an optical image of an object is formed into an image via a lens 210, a diaphragm 211, lens mounts 202 and 102, and a shutter 144. The image pickup device 121 delivers an electric signal (analog signal) associated with the formed optical image. This analog signal is converted to a digital signal by analog-to-digital conversion by an analog-to digital converter 122.

The digital signal as an output from the analog-to digital converter 122 is stored in a memory 127 as image data under the control of a memory controller 124 and a system controller 120. An image processor 123 carries out a predetermined pixel interpolation process and a predetermined color conversion process on the digital signal as the output from the analog-to digital converter 122 or image data read out from the memory 127 by the memory controller 124.

Note that the image processor 123 is provided with a compression/expansion circuit for compressing or expanding image data by adaptive discrete cosine transformation (ADCT) or the like. The compression/expansion circuit performs compression or expansion processing on the image data stored in the memory 127, and then writes the processed image data into the memory 127.

Further, the image processor 123 calculates a contrast value of the image data, and measures a focusing state of an image to be shot based on the contrast value.

The memory controller 124 controls transmission and reception of image data between the analog-to digital converter 122, the image processor 123, a display device 110, and an external removable memory 130 and the memory 127. The digital signal as an output from the analog-to digital converter 122 is written into the memory 127 via the image processor 123 and the memory controller 124 or directly via the memory controller 124.

The display device 110 is a liquid crystal display equipped with a touch panel function, for example, and comprises a liquid crystal panel display 125, a backlight illuminator 126, and a touch panel 154.

The liquid crystal panel display 125 displays a menu screen stored in an image display data area of the memory 127 or an image file (image data) stored in the external removable memory 130, as an image, under the control of the system controller 120. The backlight illuminator 126 illuminates the back surface of the liquid crystal panel display 125.

An LED (light emitting diode), an organic EL or a fluorescent tube, for example, is used as a light source device for backlight illumination. The backlight illuminator 126 turns on or off the illumination under the control of the system controller 120.

The touch panel 154 employs, as a touch detection method, an electrostatic capacity method in which whether or not a touch operation has been performed is determined by detecting a change in electrostatic capacity. Menu operations concerning shooting settings and display settings can be performed by touch operations on the touch panel 154.

Further, during live view shooting for causing a shot image to be displayed as a through image on the liquid crystal panel display 125, when an object image displayed on the liquid crystal panel display 125 is selected by a touch operation, the system controller 120 performs AF (auto focus) processing on the object image.

Note that if a plurality of threshold values of the electrostatic capacity are set, it is possible to distinguishingly detect a state in which an operation body (e.g. a finger) is causes to come closer to the touch panel 154 and a touch operation.

Figure 2A:
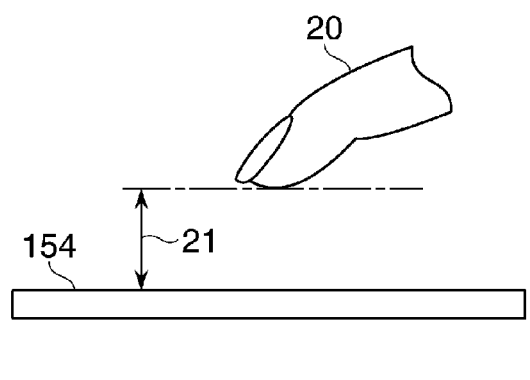
Figure 2B:
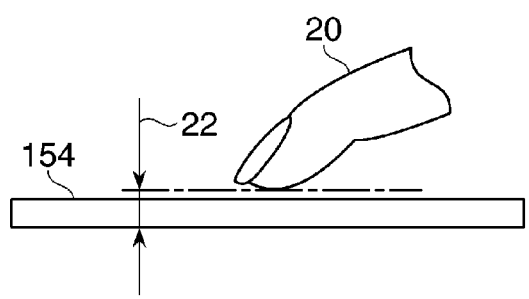

FIGS. 2A and 2B are views useful in explaining a difference between a proximity of the finger to the touch panel 154 appearing in FIG. 1 and a touch operation, in which FIG. 2A shows a state in which the finger is caused to come closer to the touch panel 154, and FIG. 2B shows a state in which the touch operation is performed on the touch panel 154.

In the illustrated examples, for detection of a change in electrostatic capacity of the touch panel 154 is detected, first and second threshold values are set. The first and second threshold values are stored e.g. in a nonvolatile memory 128 (first threshold value<second threshold value). Further, the first and second threshold values are associated with respective distances of the finger 20 from the surface of the touch panel 154.

Here, a distance associated with the first threshold value is referred to as a first distance 21, and a distance associated with the second threshold value is referred to as a second distance 22. The second distance 22 is a distance within which the touch operation on the touch panel 154 can be detected.

Now, as the user causes the finger 20 to come closer to the touch panel 154, the electrostatic capacity of the touch panel 154 changes. The system controller 120 detects the changing electrostatic capacity as a detected capacity. When the detected capacity becomes equal to or larger than the first threshold value, the system controller 120 determines that the distance between the user's finger 20 and the surface of the touch panel 154 is not larger than the first distance 21 (not larger than several centimeters, for example).

Further, as the user causes the finger 20 to come closer to the touch panel 154 and the detected capacity becomes equal to or larger than the second threshold value, the system controller 120 determines that the distance between the user's finger 20 and the surface of the touch panel 154 is not larger than the second distance 22. The second distance 22 is a distance at which the user's finger 20 is almost brought into contact with the surface of the touch panel 154.

Referring again to FIG. 1, the system controller 120 controls the overall operation of the image pickup apparatus 100. The memory 127 records still image data and moving image data obtained through shooting, and stores image data to be reproduced for display. The memory 127 has a sufficiently large storage capacity for storing a predetermined number of still image data items and moving image data items.

Note that in the memory 127, there are secured a program stack area, a status storage area, an operation area, a work area, and an image display data area for the system controller 120. The system controller 120 performs various kinds of operation using the operation area of the memory 127.

The nonvolatile memory 128 is capable of electrically recording and deleting data, and is implemented by a flash memory or an EEPROM, for example. The nonvolatile memory 128 stores information indicative of a shooting state, programs for controlling the image pickup apparatus 100, audio data of touch notification sound, and so forth.

As the external removable memory 130, a storage medium, such as a compact flash (registered trademark) card or an SD card, is used, for example. The external removable memory 130 is removably mounted in the image pickup apparatus 100. Image files are recorded in the external removable memory 130, and are read out therefrom, as required.

A power supply section 131 includes a battery, a battery detection circuit, a DC-DC converter, and a switch circuit for use in switching between blocks to be supplied with power (none of which is shown). Further, the power supply section 131 detects whether a battery is mounted, a type of the battery, and a remaining charge of the battery. The power supply section 131 controls the DC-DC converter based on results of the detection and under the control of the system controller 120, to supply a predetermined voltage to each block illustrated in FIG. 1 over a required time period.

A shutter controller 141 controls the shutter 144 based on photometric information obtained by a photometry section 142 in cooperation with a lens controller 204 for controlling the diaphragm 211.

The photometry section 142 is used for performing AE (automatic exposure) processing. Light having entered the lens 210 is given to the photometry section 142 via the diaphragm 211, the lens mounts 202 and 102, and a photometric lens (not shown). This enables the photometry section 142 to measure an exposure state of an image formed as an optical image.

Further, the photometry section 142 performs EF (electronic flash pre-emission) processing in cooperation with a strobe unit 300. The strobe unit 300 is equipped with an AF auxiliary light emission function and an electronic flash pre-emission function.

A ranging section 143 is used for performing AF processing. The light having entered the lens 210 is given to the ranging section 143 via the diaphragm 211, the lens mounts 202 and 102, and a ranging mirror (not shown). This enables the ranging section 143 to measure an in-focus state of the image formed as the optical image.

Note that in the live view shooting, the ranging section 143 can measure an in-focus state of an image being shot based on a contrast value obtained from image data output from the image processor 123.

A camera controller 140 controls a sequence of shooting operations by performing communication with the shutter controller 141, the photometry section 142, and the ranging section 143 under the control of the system controller 120. Further, the camera controller 140 controls a lens unit 200 and the strobe unit 300.

A playback switch 132, a menu switch 133, a mode dial 134, a release switch 135, other operating devices 136, an electronic dial 137, and a power switch 138 are each an operating device for inputting operation instructions to the system controller 120. The operating devices may include not only the above-mentioned switches and dials, but also a pointing device based on line-of-sight detection, a voice recognition device, etc.

Operation of the playback switch 132 causes the system controller 120 shifts to a playback mode for displaying predetermined image data on the display device 110 as a display image. To play back an image file stored in the external removable memory 130 for display, the playback switch 132 is operated. In the playback mode, when the playback switch 132 is operated, the system controller 120 shifts from the playback mode to a shooting mode.

Operation of the menu switch 133 causes the system controller 120 to display a menu list on the display device 110. The menu list includes the respective items of a shooting state setting concerning shooting, the format of a recording medium, setting of a clock, setting of development parameters, configuration of user-set functions (setting of customized functions), and so forth.

Operation of the mode dial 134 causes the system controller 120 to shift the mode between an automatic shooting mode, a program shooting mode, a shutter speed priority shooting mode, an aperture priority shooting mode, a manual shooting mode, a portrait shooting mode, a scenery shooting mode, a sport shooting mode, a night view shooting mode, a moving image shooting mode, and so forth.

The release switch 135 turns on a first switch signal (SW1) by half depression of a release button, and turns on a second switch signal (SW2) by full depression of the release button. As soon as the SW1 is turned on, the AF processing, the AE processing, AWB (auto white balance) processing, and the EF processing are started under the control of the system controller 120.

As soon as the SW2 is turned on, shooting processing is performed under the control of the system controller 120. In the shooting processing, an analog signal read out from the image pickup device 121 is written into the memory 127 as image data via the analog-to digital converter 122 and the memory controller 124.

Further, development processing is performed on the image data based on the results of computation in the image processor 123 and the memory controller 124. Furthermore, the image data is read out from the memory 127, and the image processor 123 performs compression processing thereon, and recording processing for writing the compressed image data into the external removable memory 130. In short, by turning on the SW2, the above-described sequence of processing is started.

The other operating devices 136 includes various buttons and switches (none of which are shown), and according to the operations of the other operating devices 136, the system controller 120 sets a shooting mode, a continuous shooting mode, a macro shooting mode, page feed, and flash shooting, shifts between menu options, performs balance selection, shooting image quality selection, exposure correction, date and time setting, and so forth.

Further, the other operating devices 136 includes a switch for starting and terminating live view shooting, vertical and horizontal switches, a playback image zoom magnification change switch, an image display on/off switch, a quick review on/off switch for automatic playback of a shot image immediately after shooting, and a switch for deleting images for playback (none of which are shown).

Furthermore, the other operating devices 136 includes a compression mode switch (not shown) for selecting from compression ratios of JPEG and MPEG compressions, or selecting a CCDRAW mode in which an output from the image pickup device is digitized and recorded in a recording medium.

Further to the above, the other operating devices 136 includes an AF mode setting switch (not shown) which sets a servo AF mode for continuing an AF operation in cooperation with a one-shot AF mode for holding an AF in-focus state by half depression of the release button.

Operation of the electronic dial 137 cases the system controller 120 to set a shutter speed, an aperture value, an exposure value, and so forth.

Operation of the power switch 138 causes the system controller 120 to switch the power supply section 131 on or off.

Further, in response to the operation of the power switch 138, the system controller 120 switches on or off the power supply to the lens unit 200, the strobe unit 300, and the external removable memory 130.

A timer 139 is equipped with a clock function, a calendar function, a timer counter function, and an alarm function. The timer 139 is used for system management to manage a time period to elapse before shifting the image pickup apparatus from a standby mode to a sleep mode, alarm notification, etc.

An infrared emission and reception section 150 is disposed in the vicinity of the display device 110. The infrared emission and reception section 150 comprises an infrared light emitting element and a light receiving circuit, and is configured such that light emitted from the infrared light emitting element at predetermined time intervals is reflected by a to-be-detected object, and the reflected light is detected by the light receiving circuit. The system controller 120 detects the reflected light to determine whether or not the to-be-detected object is located at a predetermined position.

The use of the infrared emission and reception section 150 makes it possible to detect whether or not the user is looking into a finder (not shown). Upon detecting that the user is looking into the finder, the system controller 120 turns off the backlight illuminator 126, for example, to thereby prevent light from the backlight illuminator 126 from entering the user's eyes, and thereby prevent the user from feeling the glare of the light.

A microphone 151 takes in e.g. voice from outside, and converts the voice to an electric signal (audio signal). This audio signal is given to an audio codec section 152. The audio codec section 152 includes a processing circuit (a codec section 403) that performs encoding and decoding of a voice signal, amplifiers (a microphone amplifier 401 and a speaker amplifier 405 that drive a microphone 151 and a speaker 153, respectively), filter circuits (a high-pass filter (HPF) 407 and a low-pass filter (LPF) 408) that eliminate noise contained in the voice signal, and an adjustment circuit (an auto level controller (ALC) 409) that adjusts the level of the voice signal (also referred to as the audio signal).

Figure 3:
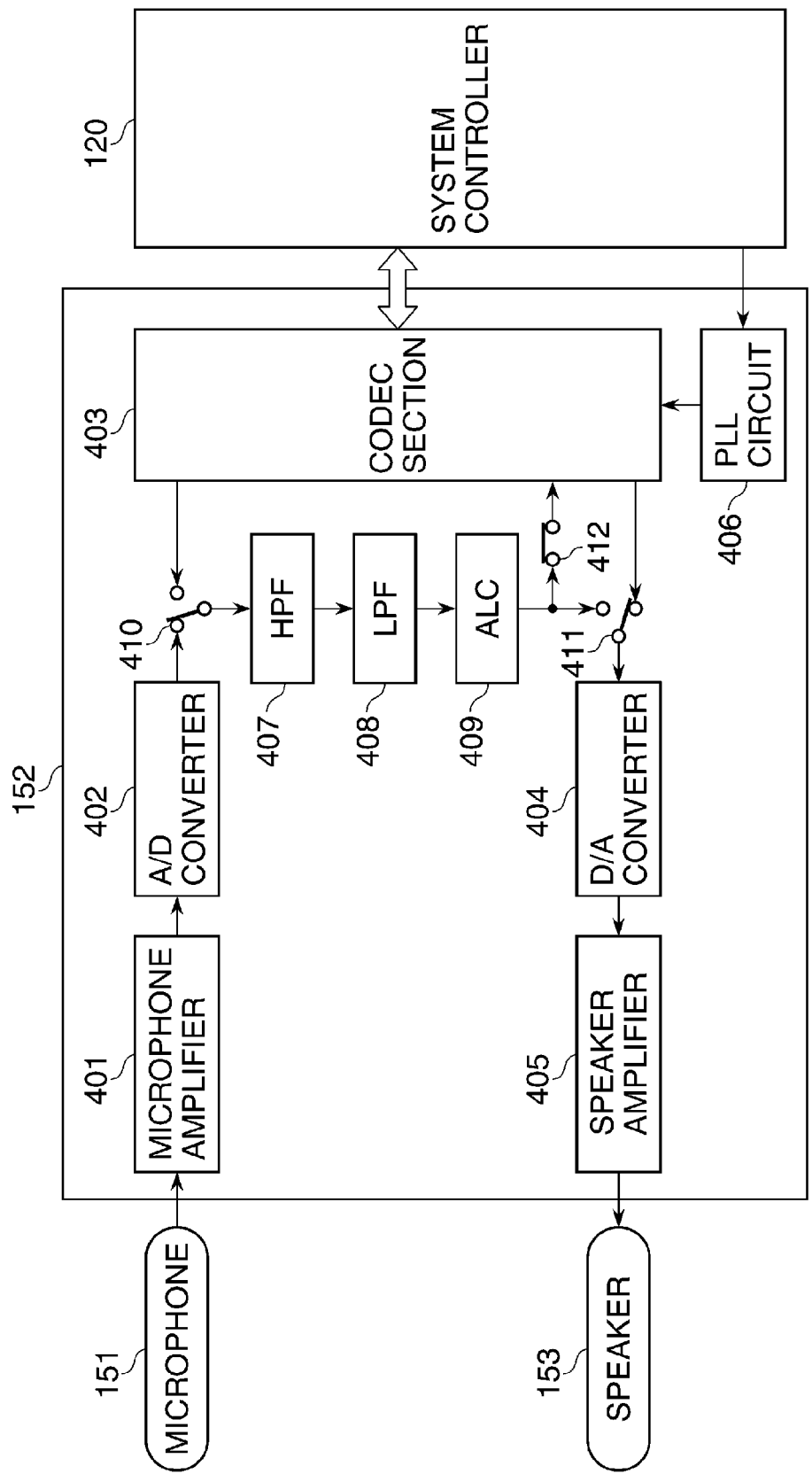
FIG. 3 is a block diagram showing details of an audio codec section appearing in FIG. 1.

FIG. 3 is a block diagram showing details of the audio codec section 152 appearing in FIG. 1.

The audio codec section 152 includes the microphone amplifier 401. The microphone amplifier 401 amplifies an analog signal input from the microphone 151. The analog signal amplified by the microphone amplifier 401 is converted to a digital signal by an analog-to-digital converter 402.

As described hereinafter, this digital signal (recording signal) is given to the codec section 403 via a switch 410, the high-pass filter (HPF) 407, the low-pass filter (LPF) 408, the auto level controller (ALC) 409, and a switch 412. The codec section 403 encodes the digital signal into an audio interface format. The encoded signal is given to the system controller 120.

The codec section 403 decodes the signal encoded into the audio interface format to thereby convert the same to a digital signal. For example, upon receipt of an encoded signal (sound signal) from the system controller 120, the codec section 403 decodes the signal, and delivers the same as a playback signal (digital signal).

The playback signal decoded by the codec section 403 is given to a digital-to-analog converter (digital-to-analog conversion unit) 404 via a switch 411, and is converted to an analog signal by the digital-to-analog converter 404. The analog signal as an output from the digital-to-analog converter 404 is amplified by the speaker amplifier 405, and is given to the speaker 153. The speaker 153 outputs sound or audio according to the output from the speaker amplifier 405.

As described above, the audio codec section 152 plays back sound according to sound data or audio data.

As illustrated in FIG. 3, a PLL (phase locked loop) circuit 406 is connected to the codec section 403. The PLL circuit 406 generates an oscillation signal fvco having a sampling frequency, for use in the codec section 403, based on a reference signal output from the system controller 120.

Figure 4:
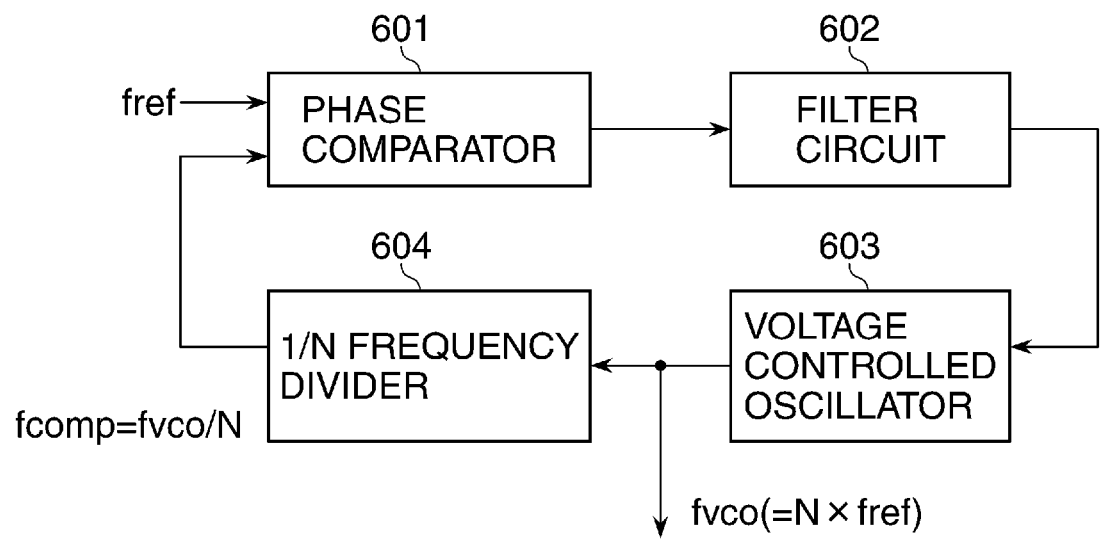
FIG. 4 is a block diagram showing details of a PLL circuit appearing in FIG. 3.

FIG. 4 is a block diagram showing details of the PLL circuit 406 appearing in FIG. 3.

Referring to FIG. 4, the PLL circuit 406 includes a voltage controlled oscillator 603. The output (oscillation signal) fvco from the voltage controlled oscillator 603 is given to a frequency divider 604, in which the frequency of the output fvco is divided by 1/N (N is an integer not less than 2). A frequency division signal (fcomp=fvco/N) as an output from the frequency divider 604 is given to a phase comparator 601.

The phase comparator 601 compares the phase of the reference signal fref given from the system controller 120 and that of the frequency division signal fcomp, and outputs a difference signal indicative of a difference between the phases. The difference signal having AC components cut therefrom by a filter circuit 602 is delivered to the voltage controlled oscillator 603.

The voltage controlled oscillator 603 changes the oscillation frequency (also referred to as the "sampling frequency") of the oscillation signal (fvco=Nxfref) according to a voltage indicated by the difference signal. This oscillation signal fvco (clock signal) is given to the codec section 403 (FIG. 3).

As described hereinabove, the PLL circuit 406 generates the oscillation signal fvco (clock signal) having a frequency N times as high as the frequency of the reference signal in synchronism with the reference signal fref.

However, as described heretofore, to sufficiently remove jitter components from the difference signal, it is required to increase the time constant of the filter circuit 602. This increases time taken to obtain the oscillation signal fvco synchronous with the reference signal fref after the reference signal fref is input.

Referring again to FIG. 3, the high-pass filter 407 is a high-pass filter (HPF) section for removing low-frequency components, such as wind noise. The low-pass filter 408 causes voice band components of the audio signal to pass therethrough. The auto level controller 409 adjusts the audio level of the audio signal.

The switch 410 selectively connects the analog-to-digital converter 402 to the codec section 403 or the high-pass filter 407. The switch 411 selectively connects the digital-to-analog converter 404 to the auto level controller 409 or the codec section 403.

When the switch 410 connects between the analog-to-digital converter 402 and the high-pass filter 407, the switch 411 connects between the codec section 403 and the digital-to-analog converter 404. In this case, the switch 412 is turned on, whereby a recording signal is given from the analog-to-digital converter 402 to the codec section 403 via the analog-to-digital converter 402.

On the other hand, when the switch 410 connects between the codec section 403 and the high-pass filter 407, the switch 411 connects between the auto level controller 409 and the digital-to-analog converter 404. In this case, the switch 412 is turned off, whereby a playback signal is given from the codec section 403 to the digital-to-analog converter 404 via the auto level controller 409.

As described above, by using the switches 410 to 412, it is possible to select which of a recording signal and a playback signal is to be caused to pass through the circuit formed by the high-pass filter 407, the low-pass filter 408, and the auto level controller 409.

In addition, by using the switch 411, it is possible to directly output the playback signal from the codec section 403 to the digital-to-analog converter 404 without causing the playback signal to pass through the high-pass filter 407, the low-pass filter 408, and the auto level controller 409.

The system controller 120 uses the audio codec section 152 to record sound, such as voice, obtained by the microphone 151, as a recording signal (encoded signal) in the memory 127 or the external removable memory 130.

Further, the system controller 120 outputs sound data recorded in the nonvolatile memory 128 and the external removable memory 130, as sound, such as voice, which is reproduced by the audio codec section 152, from the speaker 153.

Note that although not shown, the system controller 120 performs independent on/off-control of power supply to the microphone amplifier 401, the analog-to-digital converter 402, the digital-to-analog converter 404, the speaker amplifier 405, and the PLL circuit 406, which are provided in the audio codec section 152. Further, the system controller 120 can also perform collective on/off-control of power supply to the whole audio codec section 152.

Referring again to FIG. 1, the lens mounts 102 and 202 are interfaces for connecting the image pickup apparatus 100 to the lens unit 200. Connectors 101 and 201 electrically connect the image pickup apparatus 100 to the lens unit 200. The lens unit 200 is controlled by the camera controller 140.

The lens unit 200 is an replaceable type. An optical image of an object passes through the diaphragm 211, the lens mounts 202 and 102, and the shutter 144 via the lens 210 of the lens unit 200, and forms an image on the image pickup device 121.

The lens unit 200 is provided with the lens controller 204. A distance-detecting section 203 is connected to the lens controller 204 such that the distance-detecting section 203 gives a distance from the lens 210 to the object to the lens controller 204 as a detected distance.

The lens controller 204 includes a memory and a nonvolatile memory (neither of which is shown). The memory stores constants, variables, programs, etc., for use in operation of the lens 210. Further, the nonvolatile memory stores identification information, such as a number unique to the lens unit 200, management information, function information, such as a maximum aperture value, a minimum aperture value, and a focal length, current and past settings, and so forth.

The lens controller 204 controls focusing of the lens 210 according to an in-focus state measured by the ranging section 143 or the image processor 123 under the control of the camera controller 140.

As a consequence, the lens controller 204 changes a position where an optical image entering the image pickup device 121 is formed, and performs an AF operation. Further, the lens controller 204 controls the diaphragm 211 and zooming of the lens 210.

Accessory shoes 111 and 301 are interfaces for connecting the image pickup apparatus 100 to the strobe unit 300. The strobe unit 300 is connected to the accessory shoe 111 by the accessory shoe 301.

The strobe unit 300 includes a strobe light emission controller 302. When the strobe light emission controller 302 causes a light emitter (not shown), such as a xenon tube, to emit light under the control of the camera controller 140, the strobe light emission controller 302 controls the amount of light emitted from the light emitter and timing of emission of the light, based on results of measurement by the photometry section 142.

Next, a description will be given of a touch operation-accepting process carried out by the image pickup apparatus 100 shown in FIG. 1.

Figure 5A:
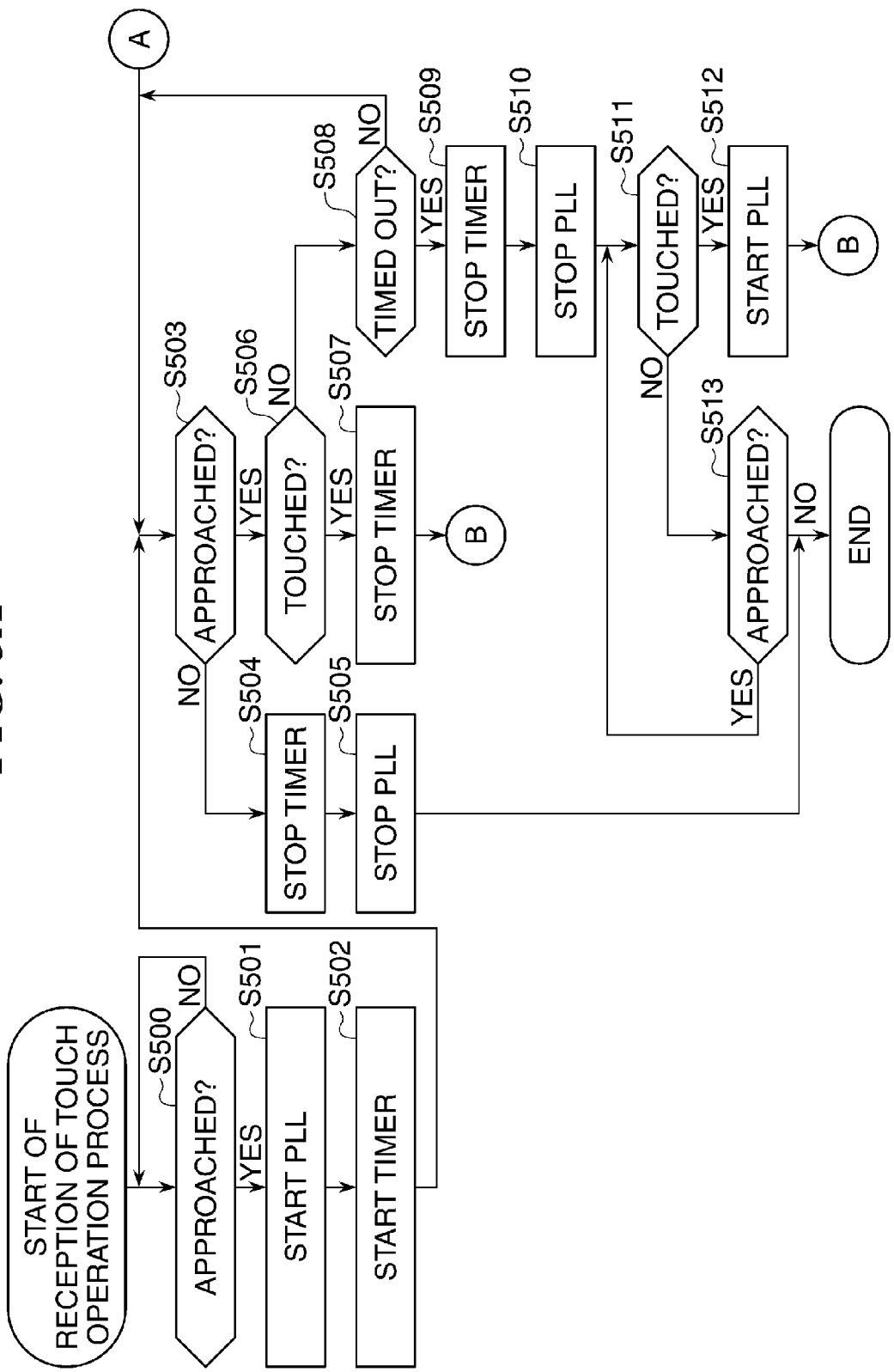
FIG. 5A is a flowchart of a touch operation-accepting process carried out by the image pickup apparatus shown in FIG. 1.
Figure 5B:
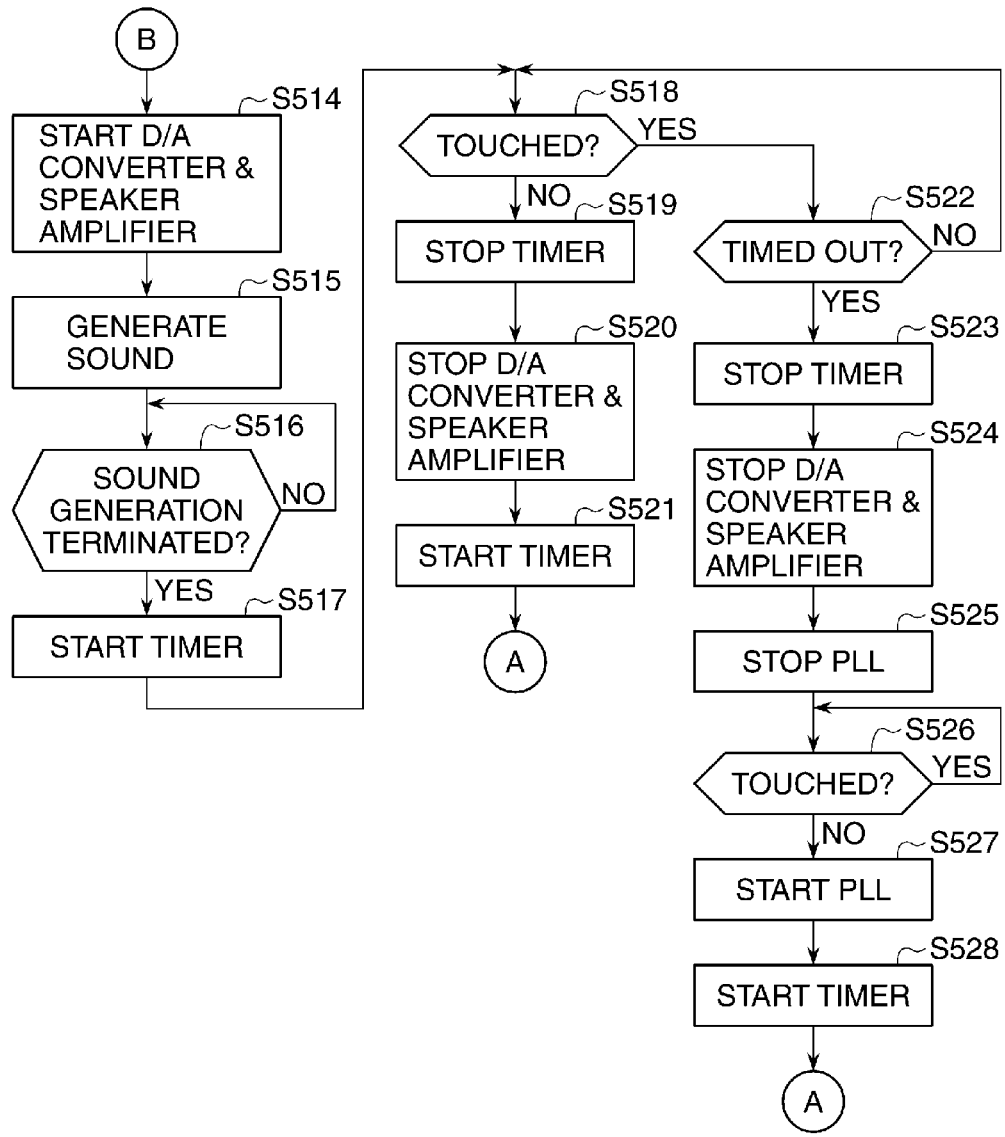
FIG. 5B is a continuation of FIG. 5A.

FIGS. 5A and 5B are a flowchart of a touch operation-accepting process carried out by the image pickup apparatus 100 shown in FIG. 1. Note that the touch operation-accepting process shown in FIGS. 5A and 5B is executed by the system controller 120.

When the touch operation-accepting process is started, the system controller 120 determines whether or not a detected capacity of the electrostatic capacity of the touch panel 154 is not smaller than the first threshold value. That is, the system controller 120 determines whether or not the user's finger has come close to the surface of the touch panel 154 (step S500).

If the detected capacity is smaller than the first threshold value (NO to the step S500), the system controller 120 remains on standby. On the other hand, if the detected capacity is not smaller than the first threshold value (YES to the step S500), the system controller 120 determines that the user's finger has come close to the surface of the touch panel 154. Then, the system controller 120 supplies power to the PLL circuit 406 of the audio codec section 152, and outputs the reference signal fref to the PLL circuit 406 to start the PLL circuit 406 (step S501).

Next, the system controller 120 starts the timer 139 to start time measurement thereby so as to measure a time period over which the user's finger stays close to the touch panel 154 (step S502).

After starting the timer 139, the system controller 120 determines again whether or not the detected capacity is not smaller than the first threshold value (step S503). If the detected capacity is smaller than the first threshold value (NO to the step S503), the system controller 120 determines that the approach of the user's finger has been canceled, and stops the time measurement by the timer 139 to reset the count value of the timer 139 (step S504).

Then, the system controller 120 stops the power supply and the output of the reference signal fref to the PLL circuit 406 (step S505), followed by terminating the touch operation-accepting process.

If the detected capacity is not smaller than the first threshold value (YES to the step S503), the system controller 120 determines that the user's finger is still in a state positioned close to the surface of the touch panel 154, and determines whether or not the detected capacity is not smaller than the second threshold value (step S506).

If the detected capacity is not smaller than the second threshold value (YES to the step S506), the system controller 120 determines that the user's finger has touched the touch panel 154, and stops the time measurement by the timer 139 to reset the timer 139 (step S507). After that, the system controller 120 proceeds to a step S514, described hereinafter.

If the detected capacity is smaller than the second threshold value (NO to the step S506), the system controller 120 determines that the user's finger has not touched the touch panel 154. Then, the system controller 120 determines whether or not a time period measured by the timer 139 (count value of the timer 139) has exceeded a predetermined measurement time period. That is, the system controller 120 determines whether or not the timer 139 has timed out (step S508).

If the timer 139 has not timed out (NO to the step S508), the system controller 120 returns to the step S503, whereas if the timer 139 has timed out (YES to the step S508), the system controller 120 stops the time measurement by the timer 139 to reset the timer 139 (step S509).

Next, the system controller 120 stops the output of the reference signal fref and the power supply to the PLL circuit 406 (step S510). Thereafter, the system controller 120 determines again whether or not the detected capacity is not smaller than the second threshold value (step S511).

If the detected capacity is not smaller than the second threshold value (YES to the step S511), the system controller 120 starts the PLL circuit 406, as described above (step S512), and then proceeds to the step S514, described hereinafter.

If the detected capacity is smaller than the second threshold value (NO to the step S511), the system controller 120 determines whether or not the operator's finger is in the state positioned close to the surface of the touch panel 154 (step S513). That is, the system controller 120 determines whether or not the detected capacity is not smaller than the first threshold value.

If the detected capacity is not smaller than the first threshold value (YES to the step S513), the system controller 120 returns to the step S511, whereas if the detected capacity is smaller than the first threshold value (NO to the step S513), the system controller 120 terminates the touch operation-accepting process.

In the step S514 in FIG. 5B, the system controller 120 supplies power to the digital-to-analog converter 404, the speaker amplifier 405, and the other blocks of the audio codec section 152, to thereby start the audio codec section 152. Then, the system controller 120 gives e.g. touch notification sound data stored in advance in the nonvolatile memory 128 to the audio codec section 152.

This causes the audio codec section 152 to generate a playback signal based on the touch notification sound data, and output the same from the speaker 153 as sound (step S515).

Then, the system controller 120 determines whether or not generation of the touch notification sound has been terminated (step S516). In the present embodiment, determination as to whether or not the generation of the touch notification sound has been terminated is executed e.g. according to touch notification sound input from the microphone 151.

If the generation of the touch notification sound has not been terminated (NO to the step S516), the system controller 120 remains on standby. On the other hand, if the generation of the touch notification sound has been terminated (YES to the step S516), the system controller 120 starts time measurement by the timer 139 in order to measure a time period over which the user's finger is touching the touch panel 154 (step S517).

Then, the system controller 120 determines whether or not the detected capacity is not smaller than the second threshold value (step S518). If the detected capacity is smaller than the second threshold value (NO to the step S518), the system controller 120 determines that the touch operation has been canceled, and stops the timer 139 to reset the count value of the timer 139 (step S519).

After that, the system controller 120 stops the power supply to the digital-to-analog converter 404, the speaker amplifier 405, and the other blocks of the audio codec section 152 (step S520). Then, the system controller 120 starts time measurement by the timer 139 in order to measure a time period over which the user's finger stays close to the touch panel 154 (step S521), and returns to the step S503.

If the detected capacity is not smaller than the second threshold value (YES to the step S518), the system controller 120 determines that the user's finger continues to be touching the touch panel 154, and determines whether or not the timer 139 has timed out (step S522). If the timer 139 has not timed out (NO to the step S522), the system controller 120 returns to the step S518.

If the timer 139 has timed out (YES to the step S522), the system controller 120 stops the time measurement by the timer 139, and resets the timer 139 (step S523). After that, the system controller 120 stops the power supply to the digital-to-analog converter 404, the speaker amplifier 405, and the other blocks of the audio codec section 152 (step S524).

Next, the system controller 120 stops the output of the reference signal fref to the PLL circuit 406, and the power supply to the PLL circuit 406 (step S525). Thereafter, the system controller 120 determines whether or not the detected capacity is not smaller than the second threshold value (step S526).

If the detected capacity is not smaller than the second threshold value (YES to the step S526), the system controller 120 determines that the user's finger continues to be touching the touch panel 154, and remains on standby. On the other hand, if the detected capacity is smaller than the second threshold value (NO to the step S526), the system controller 120 determines that the touch operation has been canceled, and starts the PLL circuit 406, as described hereinabove (step S527). Thereafter, the system controller 120 starts time measurement by the timer 139 (step S528), and returns to the step S503.

Figure 6A:
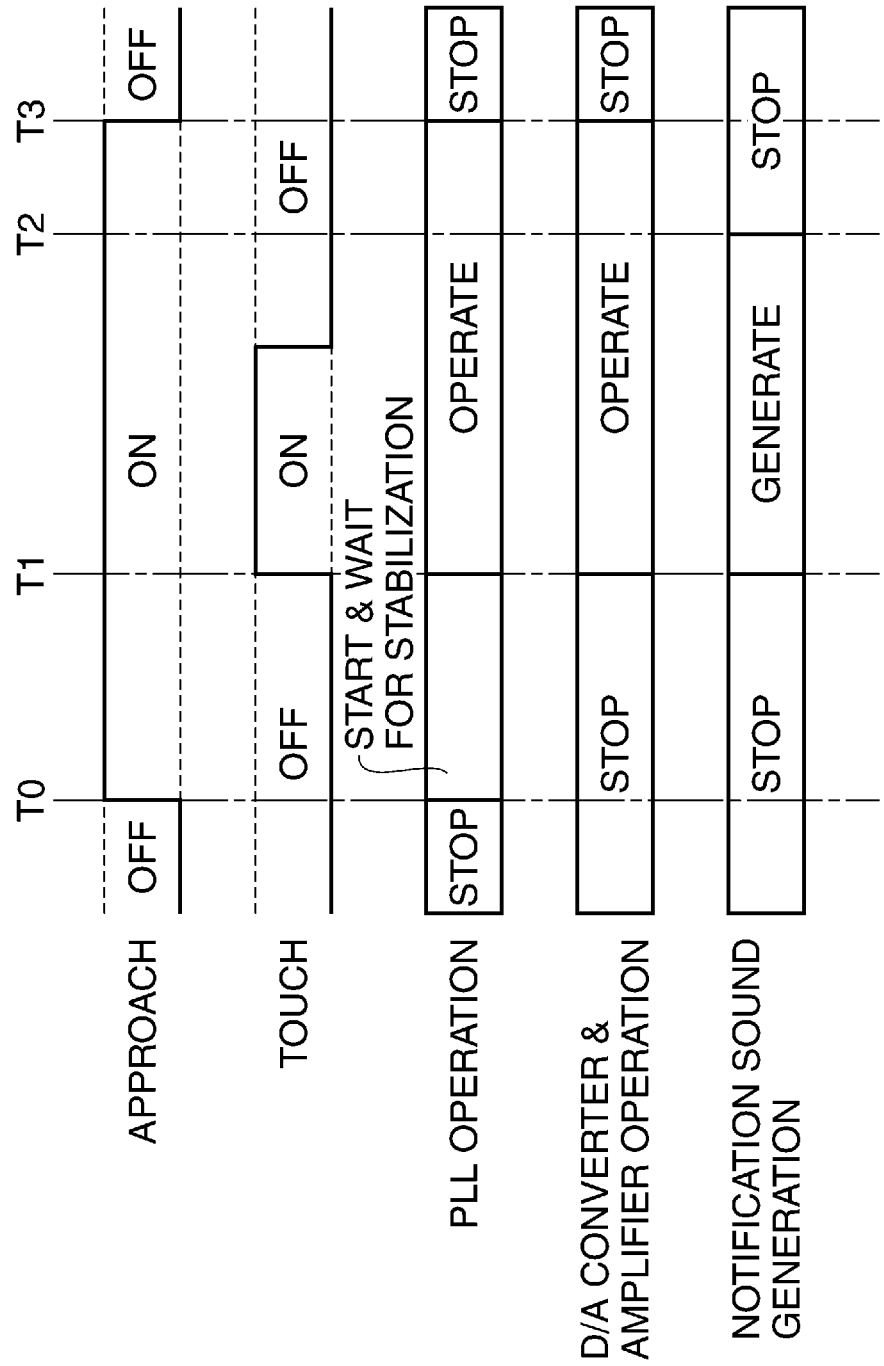
Figure 6D:
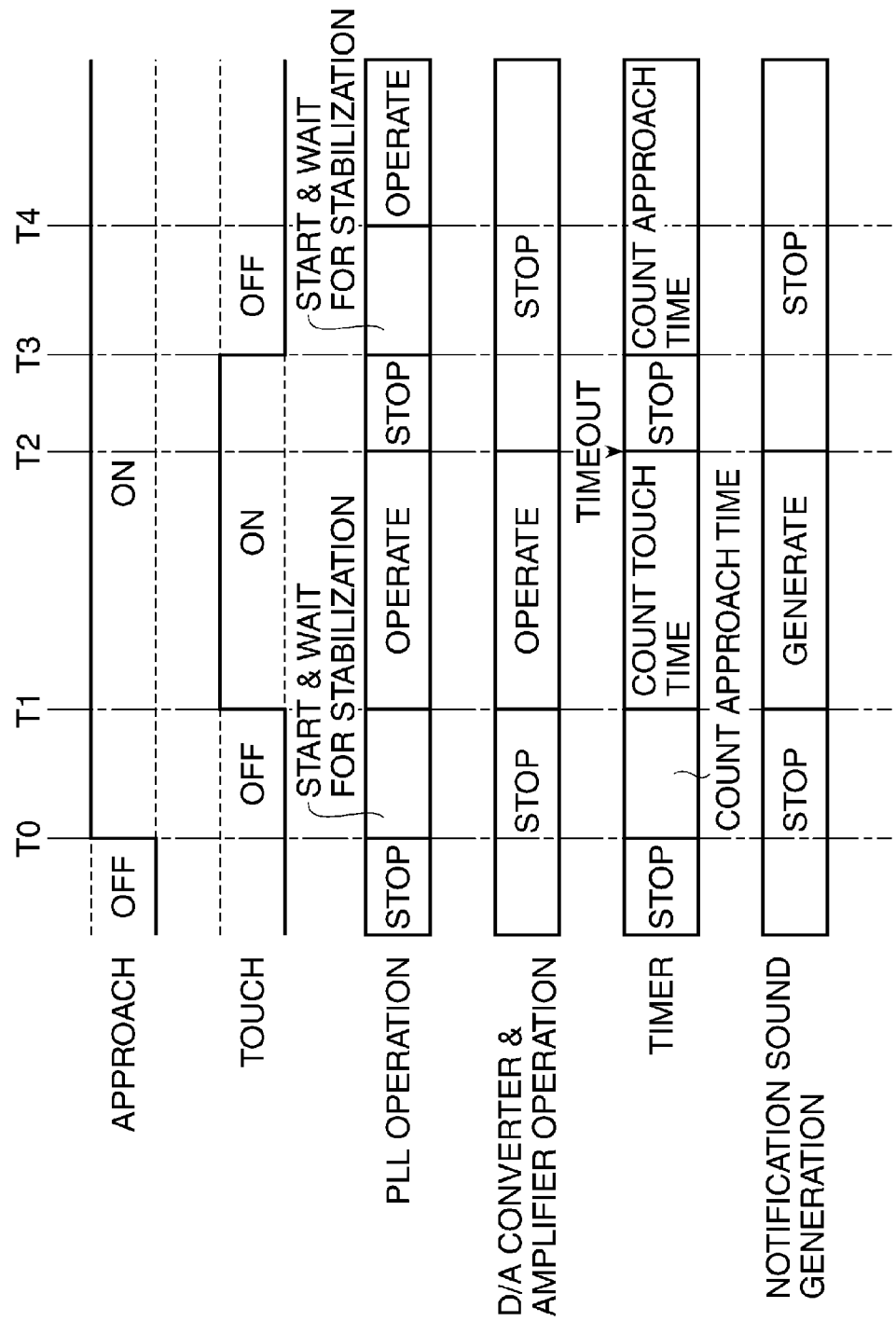

FIGS. 6A to 6D are views useful in explaining the operation timing of the audio codec section 152 during the touch operation-accepting process described with reference to FIGS. 5A and 5B. FIG. 6A shows operation timing in a case where a touch operation is performed. FIG. 6B shows operation timing in a case where a time period over which touch notification sound is generated is longer than in the FIG. 6A case. FIG. 6C shows operation timing in a case where after detecting a proximity of the finger to the panel, a state in which the touch of the finger on the touch panel is not detected continues for a long time. FIG. 6D shows operation timing in a case where a state in which the finger is touching the touch panel continues for a long time.

Referring to FIG. 6A, now, let it be assumed that the system controller 120 has detected the approach of the finger at time T0. This detection causes the system controller 120 to start the PLL circuit 406. Further, when detecting a touch of the finger at time T1, the system controller 120 supplies power to the digital-to-analog converter 404, the speaker amplifier 405, and the other blocks of the audio codec section 152. Further, the system controller 120 starts generation of the touch notification sound at the time T1.

It is assumed that at time T2, the system controller 120 confirms that the generation of the touch notification sound has been terminated. Then, at time T3, when the approach of the finger is canceled (approach-off), the system controller 120 stops power supply to the digital-to-analog converter 404, the speaker amplifier 405, and the other blocks of the audio codec section 152. Further, at the time T3, the system controller 120 stops the PLL circuit 406.

As described above, the system controller 120 starts the PLL circuit 406 when having detected the approach of the finger, and hence even when the time constant of the PLL circuit 406 (i.e. the filter circuit 602) is large, it is possible to stably operate the PLL circuit 406 after the finger approaches the touch panel and before the finger touches the touch panel.

That is, compared with a case where the PLL circuit 406 is started after detection of a touch of the finger on the touch panel 154 (hereinafter also referred to "touch detection"), it is possible to shorten a time period between the touch detection and generation of the touch notification sound. Further, if the approach of the finger is not detected, the system controller 120 stops not only the operation of the PLL circuit 406 but also power supply to each block of the audio codec section 152, so that it is possible to reduce the power consumption of the image pickup apparatus 100.

Further, the digital-to-analog converter 404, the speaker amplifier 405, and the other blocks of the audio codec section 152 can be started in a shorter time period than when the operation of the PLL circuit 406 is started. Therefore, the digital-to-analog converter 404, the speaker amplifier 405, and the other blocks are started simultaneously with touch detection.

As a consequence, during a time period from the time T0 to the time T1 shown in FIG. 6A, it is possible to stop power supply to each block of the audio codec section 152 other than the PLL circuit 406. This also makes it possible to reduce the power consumption of the image pickup apparatus 100.

Note that power supply to all the blocks of the audio codec section 152 may be started in timing in which the approach of the finger has been detected. This makes it possible to reduce the time period between touch detection and generation of the touch notification sound by a time period required for starting the digital-to-analog converter 404, the speaker amplifier 405, and the other blocks of the audio codec section 152.

Further, although in the above-described example, the approach and touch of the finger are detected by setting the first and second threshold values, respectively, a third threshold value may be set concerning the detection of the approach of the finger. In this case, the first to third threshold values are set such that they satisfy the relationship of the third threshold value<the first threshold value<the second threshold value.

Here, when the detected capacity becomes equal to or larger than the third threshold value, the PLL circuit 406 is started. When the detected capacity becomes equal to or larger than the first threshold value, power supply to the digital-to-analog converter 404, the speaker amplifier 405, and the other blocks of the audio codec section 152 is started.

This makes it possible not only to further reduce the power consumption of the image pickup apparatus 100 but also to further shorten the time period between the touch detection and generation of the touch notification sound.

Next, a description will be given of operation in the case where a time period over which touch notification sound is generated is longer than in the FIG. 6A case. In FIG. 6B, operation to the time T1 is the same as in FIG. 6A, and hence description thereof is omitted.

In the example illustrated in FIG. 6B, it is assumed that the touch is canceled at the time T2 (touch-off), and the approach is canceled at the time T3 (approach-off). In the FIG. 6B example, the time period over which the touch notification sound is generated is long, and hence the generation of the touch notification sound has not been terminated yet at the time of the approach-off, i.e. at the time T3.

Therefore, at the time T3, the system controller 120 does not stop the operation of the PLL circuit 406 nor the power supply to each block of the audio codec section 152. At time T4, if the system controller 120 confirms termination of the generation of the touch notification sound, the system controller 120 stops the power supply to the digital-to-analog converter 404, the speaker amplifier 405, and the other blocks of the audio codec section 152. Further, at the time T4, the system controller 120 stops the PLL circuit 406.

As described hereinabove, when generation of the touch notification sound is not terminated at the time of the approach-off, the system controller 120 stops, only after the generation of the touch notification sound is terminated, the power supply to the digital-to-analog converter 404, the speaker amplifier 405, and the other blocks, and stops the PLL circuit 406. This makes it possible to prevent the operation of the audio codec section 152 from stopping during the generation of the touch notification sound.

Next, a description will be given of the case where the state in which a touch of the finger on the touch panel is not detected continues for a long time after detection of the approach of the finger to the panel.

In the example illustrated in FIG. 6C, at the time T0, the system controller 120 detects the approach of the finger, and starts the PLL circuit 406. At this time, as described hereinabove, the system controller 120 starts time measurement by the timer 139 in order to measure a time period over which the finger is in the state positioned close to the surface of the touch panel 154. Then, at the time T1, the system controller 120 determines that the timer 139 has timed out.

As a consequence, the system controller 120 stops the time measurement by the timer 139, and resets the timer 139. Then, the system controller 120 stops the PLL circuit 406.

After that, upon detection of a touch of the finger at the time T2, the system controller 120 starts the PLL circuit 406. Then, at the time T3, the system controller 120 starts power supply to the digital-to-analog converter 404, the speaker amplifier 405, and the other blocks of the audio codec section 152, to execute generation of the touch notification sound.

As described above, when the state in which the finger positioned close to the touch panel 154 continues for a predetermined time period, the system controller 120 determines that the user has no intention of approaching the touch panel, and stops the operation of the PLL circuit 406 to thereby reduce the power consumption of the image pickup apparatus 100.

In the illustrated example, after the touch of the finger is detected at the time T2, the system controller 120 generates the touch notification sound at the time T3, and hence there is produced a time lag between the touch detection and the generation of the touch notification sound. Therefore, it is desirable to monitor a change in the detected capacity of the touch panel 154.

For example, in a state where the approach of the finger is detected but the touch of the finger is not detected, when the detected capacity is not larger than a predetermined capacity, the system controller 120 starts time measurement by the timer 139. Then, after the timer 139 has timed out, when the amount of change in the detected capacity exceeds a predetermined amount of change, and at the same time the direction of the change in the detected capacity coincides with a direction of the same in a case where the finger approaches the touch panel 154, the system controller 120 starts the PLL circuit 406.

With this configuration, upon detection of a movement of a finger which will cause shift from the approached state to the touched state of the surface of the touch panel 154, the system controller 120 starts the PLL circuit 406, and hence the PLL circuit 406 is started prior to touch detection. As a consequence, it is possible to reduce the time lag caused between the touch detection and generation of the touch notification sound, to further reduce the power consumption of the image pickup apparatus 100.

Next, a description will be given of operation in the case where the state in which the finger is touching the touch panel continues for a long time.

In the example illustrated in FIG. 6D, at the time T0, the system controller 120 detects the approach of the finger, and starts the PLL circuit 406. At this time, as described hereinabove, the system controller 120 starts time measurement by the timer 139 in order to measure a time period over which the finger is in the state positioned close to the surface of the touch panel 154.

Upon detection of a touch of the finger at time T1, the system controller 120 supplies power to the digital-to-analog converter 404, the speaker amplifier 405, and the other blocks of the audio codec section 152. This causes generation of the touch notification sound to be started. At this time, the system controller 120 stops the time measurement by the timer 139, and resets the timer 139.

However, even after the generation of the touch notification sound is terminated, the finger remains in contact with the touch panel 154, and hence the system controller 120 starts time measurement by the timer 139 in order to measure a time period over which the user is touching the touch panel 154. Then, at the time T2, the system controller 120 determines that the timer 139 has timed out.

As a consequence, the system controller 120 stops the time measurement by the timer 139, and resets the timer 139. Then, the system controller 120 stops the power supply to the digital-to-analog converter 404, the speaker amplifier 405, and the other blocks, and stops the operation of the PLL circuit 406.

At the time T3, when detecting that the finger has ceased to touch the touch panel 154, and has been placed in the state positioned close to the surface of the touch panel 154, the system controller 120 starts the PLL circuit 406. Then, the system controller 120 starts time measurement by the timer 139 in order to measure a time period over which the finger is in the state positioned close to the surface of the touch panel 154.

As described above, when the state in which the finger is touching the touch panel 154 continues for a predetermined time period, the system controller 120 determines that the user has no intention of touching the touch panel 154, and stops the operation of the PLL circuit 406, for reduction of power consumption. Then, upon detection of shifting from the touched state to the approached state of the surface of the touch panel 154, the system controller 120 starts the PLL circuit 406. This makes it possible to prepare for the next touch operation.

Note that although in the above-described embodiment, an approach of an operation body, such as a finger, is detected by the touch panel 154 of an electrostatic capacity type, any other suitable method may be employed insofar as it is capable of detecting an approach of an operation body, such as a finger.

For example, in the above-described image pickup apparatus 100, the infrared emission and reception section 150 is used so as to detect whether or not the user is looking into the finder, and hence an approach of a finger may be detected by the infrared emission and reception section 150. More specifically, the image pickup apparatus 100 may be configured to perform, when an approach of an object has been detected by the infrared emission and reception section 150, the same processing as performed when the detected capacity by the above-described touch panel 154 is not smaller than the first threshold value.

When an approach of a finger is detected by the infrared emission and reception section, the amount of received infrared light is handled as an equivalent to the detected capacity by the touch panel 154, and the approach of the finger is detected based on the amount of received infrared light.

As described heretofore, according to the embodiment of the present invention, in an electronic apparatus that generates sound by receiving a touch operation, it is possible to reduce a time lag between the touch detection and generation of the sound, and what is more, to reduce power consumption.

Note that although in the above-described embodiment, the description has been given of the case where the PLL circuit 406 is started only when an approach of a finger is detected, while holding the operation of the PLL circuit 406 in a stopped state before the detection, by way of example, this is not limitative, but there may be employed a method in which a clock frequency supplied from the PLL circuit 406 is increased when the approach of the finger is detected, while holding the clock frequency low before the detection.

Further, control by the system controller 120 may be performed by one hardware device, or by a plurality of hardware devices sharing the control process.

As is apparent from the above description, in FIGS. 1 and 3, the audio codec section 152 and the speaker 153 function as a notification unit. Further, the PLL circuit 406 functions as a clock supply unit, and the system controller 120 functions as a detection unit and a start unit. Furthermore, the system controller 120 and the timer 139 function as a timer unit.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions. Further, the embodiments of the present invention are described only by way of example, and it is possible to combine the embodiments on an as needed basis.

Further, although in the above-described embodiment, the present invention is applied to an image pickup apparatus, by way of example, this is not limitative, but the present invention can be applied to any other electronic apparatuses insofar as they perform notification upon receipt of an operation on an operating section, such as a touch panel. For example, the present invention is also applicable to a personal computer, a PDA, a cellular phone terminal, a portable image viewer, a printer including a display, a digital photo frame, a music player, a game machine, an electronic book reader, and so forth.

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

This application claims priority from Japanese Patent Application No. 2011-288268 filed Dec. 28, 2011, which is hereby incorporated by reference herein in its entirety.

What is claimed is:

1. An electronic apparatus that notifies, when a predetermined operation has been performed on an operation section, that the operation has been accepted, comprising:
   a notification unit configured to perform notification indicating reception of an operation performed on the operation section according to the operation;
   a clock supply unit configured to supply said notification unit with a clock signal for causing said notification unit to operate;
   a detection unit configured to detect an approach of an operation body for operating the operation section, to the operation section; and
   a control unit configured to perform control such that said clock supply unit is started or such that a clock frequency supplied from said clock supply unit is increased, when it is detected by said detection unit that a distance between the operation body and the operation section has become equal to or smaller than a first distance which is larger than a distance at which the operation unit receives an operation about which said notification unit is to perform the notification.

2. The electronic apparatus according to claim 1, wherein said clock supply unit includes:
   a filter circuit that removes jitter components from a difference signal indicative of a phase difference between a reference signal and an output from a frequency divider;
   a voltage controlled oscillator that generates the clock signal based on an output from said filter circuit; and
   a PLL circuit via which the clock signal is given to the frequency divider.

3. The electronic apparatus according to claim 1, wherein when it is detected by said detection unit that the operation body has approached the operation section within a second distance shorter than the first distance, said control unit performs control such that power is supplied to said notification unit.

4. The electronic apparatus according to claim 3, wherein said notification unit includes:
   a sound reproduction unit configured to reproduce a sound signal based on sound data;
   a digital-to-analog conversion unit configured to convert the sound signal as a digital signal to an analog signal;
   an amplification unit configured to amplify an output from said digital-to-analog conversion unit; and
   a speaker configured to output the output from said digital-to-analog conversion unit as sound, and
   wherein when it is detected by said detection unit that the distance between the operation body and the operation section is not larger than the second distance, said control unit supplies power to said digital-to-analog conversion unit and said amplification unit.

5. The electronic apparatus according to claim 3, wherein after said notification unit has been started, when notification by said notification unit is terminated and at the same time it is not detected by said detection unit that the distance between the operation body and the operation section is not larger than the first distance, said control unit performs control such that said clock supply unit is stopped and the power supply to said notification unit is stopped.

6. The electronic apparatus according to claim 3, further comprising:
   a first timer unit configured to start time measurement when it is detected by said detection unit that the distance between the operation body and the operation section is equal to or smaller than the first distance, and
   wherein in a state in which it is detected by said detection unit that the distance between the operation body and the operation section is equal to or smaller than the first distance, when a time period measured by said first timer unit becomes equal to a predetermined time period, said control unit determines that a timeout has occurred, and performs control such that said clock supply unit is stopped.

7. The electronic apparatus according to claim 6, wherein after the time measurement by said first timer unit has timed out, when it is detected by said detection unit that the distance between the operation body and the operation section has become equal to or smaller than the second distance, said control unit performs control such that said clock supply unit is started or such that the clock frequency supplied from said clock supply unit is increased.

8. The electronic apparatus according to claim 6, wherein after it has been detected by said detection unit that the distance between the operation body and the operation section is equal to or smaller than the first distance, and after the time measurement by said first timer unit has timed out, when an amount of change in the distance between the operation body and the operation section exceeds a predetermined amount of change and at the same time the operation body is moving in a direction in which the operation body approaches the operation section, said control unit performs control such that said clock supply unit is started or such that the clock frequency supplied from said clock supply unit is increased.

9. The electronic apparatus according to claim 3, further comprising a second timer unit configured to, when it is detected by said detection unit that the distance between the operation body and the operation section is equal to or smaller than the second distance in a case where the notification by said notification unit is terminated after the start of said notification unit, start time measurement, and
   wherein in a state in which it is detected by said detection unit that the distance between the operation body and the operation section is not larger than the second distance, when a time period measured by said second timer unit becomes equal to a predetermined time period, said control unit determines that a timeout has occurred, and performs control such that said clock supply unit is stopped, and the power supply to said notification unit is stopped.

10. The electronic apparatus according to claim 9, wherein after the time measurement by said second timer unit has timed out, when it is detected by said detection unit that the distance between the operation body and the operation section is equal to or smaller than the first distance but larger than the second distance, said control unit performs control such that said clock supply unit is started or such that the clock frequency supplied from said clock supply unit is increased.

11. The electronic apparatus according to claim 3, wherein said operation section includes a touch panel operated by touching by the operation body,
   wherein the second distance is provided for detecting a touch operation on said touch panel, and
   wherein said detection unit detects an electrostatic capacity defined by the operation section and the operation body, as a detected capacity, detects that the distance between the operation body and the operation section is equal to or smaller than the first distance when the detected capacity becomes equal to or larger than a first threshold value, and detects that the distance between the operation body and the operation section is equal to or smaller than the second distance when the detected capacity becomes equal to or larger than a second threshold value larger than the first threshold value.

12. A method of controlling an electronic apparatus including a notification unit configured to perform notification indicating reception of an operation performed on the operation section according to the operation, and a clock supply unit configured to supply the notification unit with a clock signal for causing the notification unit to operate, comprising:

detecting an approach of an operation body for operating the operation section, to the operation section; and performing control such that the clock supply unit is started or such that a clock frequency supplied from the clock supply unit is increased, when it is detected by said detecting that a distance between the operation body and the operation section has become equal to or smaller than a first distance which is larger than a distance at which the operation unit receives an operation about which the notification unit is to perform the notification.

13. A non-transitory computer-readable storage medium storing a computer-executable program for causing a computer included in an electronic apparatus to execute a method of controlling the electronic apparatus including a notification unit configured to perform notification indicating reception of an operation performed on the operation section according to the operation, and a clock supply unit configured to supply the notification unit with a clock signal for causing the notification unit to operate, wherein the method comprises:

detecting an approach of an operation body for operating the operation section, to the operation section; and performing control such that the clock supply unit is started or such that a clock frequency supplied from the clock supply unit is increased, when it is detected by said detecting that a distance between the operation body and the operation section has become equal to or smaller than a first distance which is larger than a distance at which the operation unit receives an operation about which the notification unit is to perform the notification.

* * * * *